United States Patent
Gouriou et al.

(10) Patent No.: US 7,185,320 B2
(45) Date of Patent: Feb. 27, 2007

(54) SYSTEM AND METHOD FOR PROCESSING BREAKPOINT EVENTS IN A CHILD PROCESS GENERATED BY A PARENT PROCESS

(75) Inventors: Eric Gouriou, Sunnyvale, CA (US); Robert Hundt, Santa Clara, CA (US); Sujoy Saraswati, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 661 days.

(21) Appl. No.: 10/608,179

(22) Filed: Jun. 27, 2003

(65) Prior Publication Data
US 2004/0268315 A1 Dec. 30, 2004

(51) Int. Cl.
*G06F 9/45* (2006.01)
(52) U.S. Cl. .................................... 717/130
(58) Field of Classification Search ............... 717/130
See application file for complete search history.

(56) References Cited

U.S. PATENT DOCUMENTS

| | | | |
|---|---|---|---|
| 4,812,981 A | | 3/1989 | Chan et al. |
| 5,297,274 A | | 3/1994 | Jackson |
| 5,319,645 A | | 6/1994 | Bassi et al. |
| 5,533,192 A | * | 7/1996 | Hawley et al. ............... 714/28 |
| 5,835,765 A | | 11/1998 | Matsumoto |
| 6,185,702 B1 | | 2/2001 | Shirakihara et al. |
| 6,249,882 B1 | | 6/2001 | Testardi |
| 6,269,442 B1 | | 7/2001 | Oberhauser et al. |
| 6,314,567 B1 | | 11/2001 | Oberhauser et al. |
| 2003/0106046 A1 | * | 6/2003 | Arnold et al. ............... 717/129 |
| 2003/0200410 A1 | * | 10/2003 | Russo et al. ................. 711/170 |
| 2004/0268317 A1 | * | 12/2004 | Gouriou et al. ............. 717/130 |

OTHER PUBLICATIONS

Dynamic Binary Instrumentation on IA-64, by Ramasamy et al., dated Dec. 1-5, 2001, EPICI Workshop, Micro34, pp. 1-13.
HP Caliper—An Architecture for Performance Analysis Tools, by Robert Hundt, Hewlett-Packard Company, Undated, pp. 1-8.

* cited by examiner

*Primary Examiner*—John Chavis (57) ABSTRACT

A software tool includes logic configured to enable a child process that inherits the address space of a modified parent process to execute an unaltered version of the address space when the child process inherits the altered address space of the parent process. A method for processing breakpoint events in a child process created from a parent process, when the parent process is modified by a software tool includes, storing unmodified parent process code replaced by each occurrence of a breakpoint inserted into the address space during modification of the parent process, monitoring execution of a child process created by the parent process for an initial breakpoint in the address space, suspending execution of the child process in response to an initial breakpoint, replacing each occurrence of a breakpoint in the address space with the unmodified parent process code, and resuming execution of the child process.

12 Claims, 8 Drawing Sheets

SYSTEM AND METHOD FOR PROCESSING BREAKPOINT EVENTS IN A CHILD PROCESS GENERATED BY A PARENT PROCESS

BACKGROUND

The computing community has developed tools and methods to analyze the run-time behavior of a computer program. Many of the tools and methods use statistical sampling and binary instrumentation techniques. Statistical sampling is performed by recording periodic snapshots of the program's state, e.g., the program's instruction pointer. Sampling imposes low overhead on a program's run time performance, is relatively non-intrusive, and imprecise. For example, a sampled instruction pointer may not be related to the instruction address that caused a particular sampling event.

While binary instrumentation leads to more precise results, the accuracy comes at some cost to the run-time performance of the instrumented program. Because the binary code of a program is modified, all interactions with the processor and the operating system can change significantly. For example, additional instructions and changes to a program's cache and paging behaviors can cause significant run-time performance degradation. Consequently, binary instrumentation is considered intrusive.

Dynamic binary instrumentation allows program instructions to be changed on-the-fly and leads to a whole class of more precise run-time monitoring results without significant run-time performance increases. Unlike static binary instrumentation techniques that are applied over an entire program prior to execution of the program, dynamic binary instrumentation is performed at run-time of a program and only instruments those portions of an executable that are executed. Consequently, dynamic binary instrumentation techniques can significantly reduce the overhead imposed by the instrumentation process.

Software development tools can combine statistical sampling and dynamic binary instrumentation methods into a framework that enables performance analysis, profiling, coverage analysis, correctness checking, and testing of a program.

A basic reason for the difficulty in testing the correctness of a program is that program behavior largely depends on the data on which the program operates and, in the case of interactive programs, on the information (data and commands) received from a user. Therefore, even if exhaustive testing is impossible, as is often the case, program verification is preferably conducted by causing the program to operate with some data.

Program verification encompasses execution of the program as a process "threads" to determine if the process develops in the correct way or if undesired or unexpected events occur. A "process" is commonly defined as an address space, one or more control threads operating within the address space, and the set of system resources needed for operating with the threads. Therefore, a "process" is a logic entity consisting of the program itself, the data on which it operates, the memory resources, and input/output resources.

Generally, software development tools use two basic techniques to controllably execute program instructions, tracing functions, or tracers and symbolic analysis functions, or symbolic debuggers.

Tracing functions modify a program to be tested so that select program instructions are preceded and followed by overhead instructions that extract variable information, control execution of the instruction, and can monitor program execution. Symbolic debuggers are interactive programs, which translate a high-level language source program to be tested into a compiled program. Symbolic debuggers modify an executable copy of the source selectively inserting conditional branches to other routines, instruction sequences, and break points. The compiled and instrumented program can then be run under the control of a managing program or a software engineer via a human machine interface.

Symbolic debuggers also enable the insertion of instruction sequences for recording variables used in execution of the instruction and on user request, can add and remove break points, modify variables, and permit modification of the hardware environment. These techniques are particularly effective in that they permit step-by-step control of the execution of a program, that is, they allow the evolution of the related process to be controlled by halting and restarting the process at will and by changing parameters during the course of execution of the process. The tools also can display the execution status of the process to the software engineer in detail by means of display windows or other output devices that enable the user to continuously monitor the program. Some conventional tools automate the process of setting break points in the executable version of the source code.

Symbolic debuggers have several limitations. First, they operate on only a single process at a time. Second, because the process to be tested is generated as a child of the symbolic analysis parent, and in a certain sense is the result of a combination of the symbolic analysis function/program with the program to be tested, the two processes must share or utilize the same resources. As a consequence, interactive programs that use masks and windows on a display device cannot be tested because they compete or interfere with the symbolic debugger in requiring access to the display device.

One operating system that has gained widespread acceptance is the UNIX® operating system. UNIX® is a trademark of the American Telephone and Telegraph Company of New York, N.Y., U.S.A.

The UNIX® operating system is a multi-user, time-sharing operating system with a tree-structured file system. Other noteworthy functional features are its logical I/O capabilities, pipes, and forks. The logical I/O capabilities allow a user to specify the input and output files of a program at runtime rather than at compile time, thus providing greater flexibility. Piping is a feature that enables buffering of input and output data to and from other processes. Forking is a feature that enables the creation of a new process.

By themselves, these features offer no inherent benefits. However, the UNIX® operating system command environment (called the SHELL) provides easy access to these operating system capabilities and also allows them to be used in different combinations. With the proper selection and ordering of system commands, logical I/O, pipes, and forks, a user at the command level can accomplish tasks that on other operating systems would require writing and generating an entirely new program. This ability to easily create application program equivalents from the command level is one of the unique and primary benefits of the UNIX® operating system.

The popularity of the UNIX® operating system has led to the creation of numerous open source and proprietary variations such as LINUX®, HP-UX®, PRIMIX®, etc. LINUX® is a trademark of William R. Della-Croce, Jr. (individual) of Boston, Mass., U.S.A. HP-UX®, is a trademark of the Hewlett-Packard Company, of Palo Alto, Calif., U.S.A. PRIMIX® is a trademark of Primix Solutions, Inc., of Watertown, Massachusetts, U.S.A. These and other variants of the UNIX® operating system inherently use the UNIX® operating system's logical I/O capabilities, pipes, and forks.

Software development tools can encounter a number of undesirable conditions when an instrumented process under test includes a "vfork" instruction. The operation of a "vfork" instruction in the UNIX® operating system involves spawning a new process, and then copying the process image of the parent (the process making the vfork call) to the child process (the newly spawned process). The parent process is suspended until the child process terminates. Consequently, the child process inherits any changes made to the address space of the parent process before the child is created and any change made to the address space of the child process necessarily changes the address space of the parent process.

The dynamic instrumentation process changes the address space of a target application. More specifically, it inserts breakpoints into the function entry points in the text region. When an instrumented target process executes a vfork instruction, the child process inherits the text region containing the breakpoints from the parent (i.e., the target) process.

Figure 1:
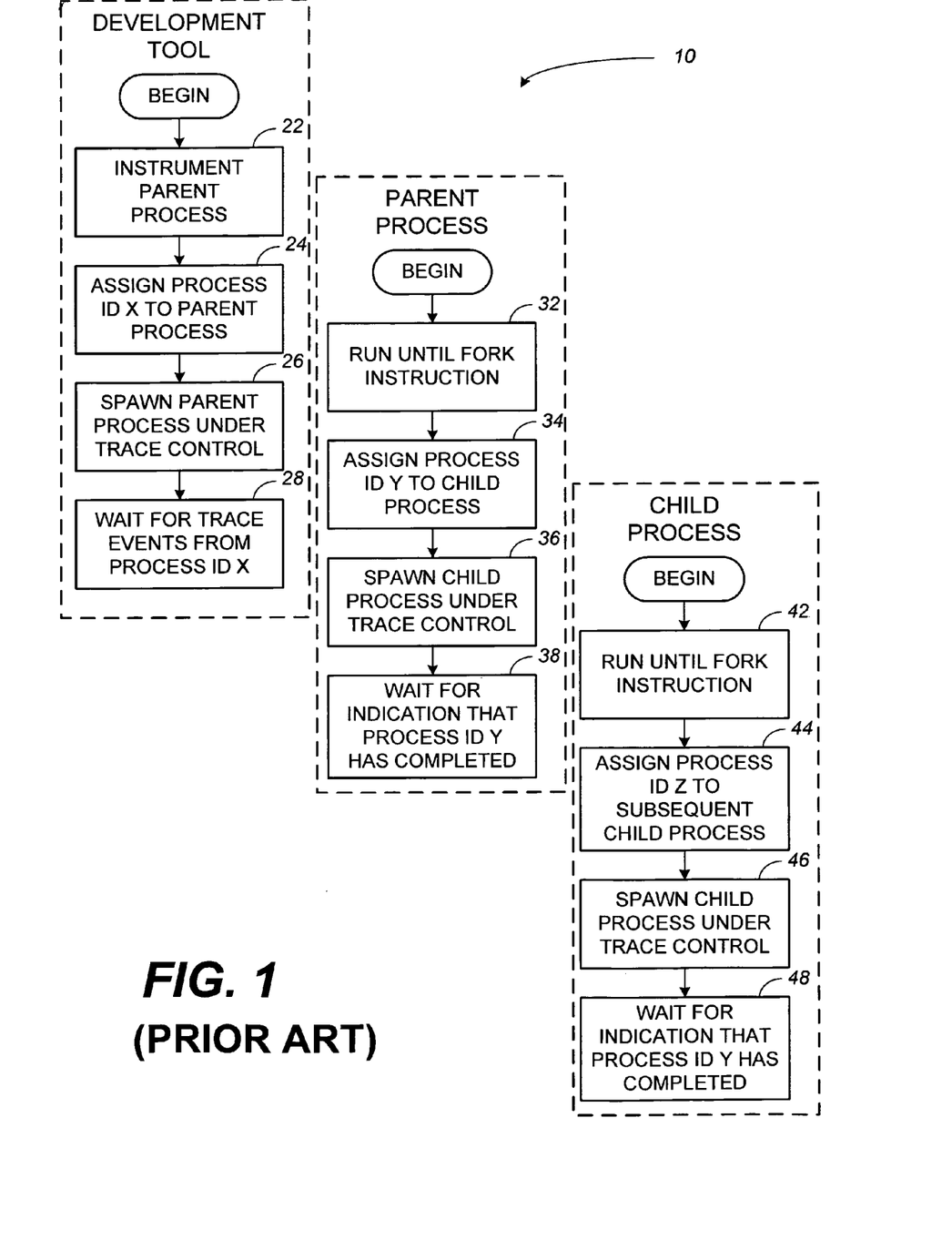
FIG. 1 is a composite flowchart illustrating a prior art deadlock condition.

FIG. 1 illustrates a deadlock condition. Deadlock condition 10 occurs between development tool 20, parent process 30, and child process 40 as follows. Development tool 20 instruments parent process 30 as indicated in function 22. A process identifier (process ID) is assigned to the parent process 30 in function 24. Next, the development tool 20 monitors execution of the parent process using trace control as shown in function 26. Under the UNIX® operating system and its open source and proprietary variants, development tool 20 waits for trace events that include the process ID of the parent process as indicated in function 28. Development tool 20 cannot monitor child process 40, since child process 40 has not been created.

Once parent process 30 is created and started, parent process 30 runs nominally in accordance with its instructions until it encounters a vfork instruction as shown in function 32. Thereafter, as shown in function 34, a process ID, different from the parent process ID, is assigned to the child process, to identify the child process. In accordance with the vfork instruction, parent process 30 copies itself in its instrumented state to spawn child process 40 and generates a trace event which is received by development tool 20. Thereafter, as shown in function 38, parent process 30 is essentially suspended waiting for an indication that child process 40 has completed (e.g., indicia of an exec or exit).

Once child process 40 is created by the vfork instruction in parent process 30, child process 40 runs nominally in accordance with its instructions until it encounters the vfork instruction shown in function 42. Thereafter, as shown in function 44, a new process ID, different from the child's process ID is assigned to the subsequent child process, to identify the subsequent child process. As illustrated in function 46, in accordance with the vfork instruction, child process 40 copies itself in its instrumented state to spawn the subsequent child process (not shown) and generates a trace event which is ignored by development tool 20 because development tool 20 is only looking for trace events from parent process 30.

Once the vfork instruction is encountered and processed in child process 40, the deadlock condition has occurred. Parent process 30 is suspended waiting for an indication that child process 40 has completed. Child process 40, which inherited trace control from parent process 30, waits for a process to handle the trace event generated at the time it executed the vfork instruction. Development tool 20 waits for a trace event from parent process 30.

Consequently it is desirable to have an improved apparatus, program, and method for handling vfork instruction induced deadlocks when using debugging techniques to instrument and monitor computer programs. It is also desirable to have an improved apparatus, program, and method for processing breakpoint events encountered during the execution of a child process. It is further desired to process breakpoint events encountered when executing a child process without further modifying the instrumented parent process.

SUMMARY

An embodiment of a software tool includes logic configured to enable a child process that inherits the address space of a modified parent process to execute an unaltered version of the address space when the child process inherits the altered address space of the parent process.

An embodiment of a method for processing breakpoint events in a child process created from a parent process, when the parent process is modified by a software tool includes, storing unmodified parent process code replaced by each occurrence of a breakpoint inserted into the address space during modification of the parent process, monitoring execution of a child process created by the parent process for an initial breakpoint in the address space, suspending execution of the child process in response to an initial breakpoint, replacing each occurrence of a breakpoint in the address space with the unmodified parent process code, and resuming execution of the child process.

BRIEF DESCRIPTION OF THE DRAWINGS

Systems and methods for processing breakpoints in a child process generated by a modified parent process, as well as a method for run-time measuring a parent process modified by a software tool are illustrated by way of example and not limited by the implementations in the following drawings. The components in the drawings are not necessarily to scale, emphasis instead is placed upon clearly illustrating the principles used in controlling the execution of such a child process. Moreover, in the drawings, like reference numerals designate corresponding parts throughout the several views.

DETAILED DESCRIPTION

A debug interface uses system calls to monitor or otherwise control thread and process execution. A thread is that part of a program that can execute independently of other parts of the program. Operating systems such as UNIX® that support multithreading, enable programmers to design programs whose threaded parts can execute concurrently.

Tracing facilities enable a process or thread to control the execution of another process or thread, respectively. Tracing facilities enable breakpoint and event driven debugging of programs. Thread trace or ttrace is a tracing facility for single and multithreaded processes. Process trace or ptrace is a tracing facility that enables a parent process to manipulate the state of a cooperative child process. While under the control of a tracing facility, the traced code behaves normally until one of its threads or the process encounters a signal, or an event. When the signal or event is encountered, the thread or process enters a stopped or suspended state and the tracing process is notified of the signal or the event via a ttrace_wait instruction. The instruction includes an argument that determines the action to be taken.

A tracing process can set event flags in the context of a traced process, or its individual threads, to cause the threads to respond to specific events during their execution. When an event flag is set in the context of the process, all threads in the process respond to the event. When set in the context of a thread, only the specific thread will respond to the event.

If an event is requested by a process, the event mask of the thread is not examined. For the event mask of the thread to be significant, the process event must be unset. Similarly, if an event option is enabled in the process, the option for the thread is not considered. Event masks may be inherited across vfork instructions. For example, if tteo_proc_inherit is set, the child process inherits the event mask of its parent. By default, threads stop when they receive a signal. If the signal being processed has its mask bit set, signal processing continues as though the process was not being traced. The traced thread is not stopped, and the tracing process is not notified of the signal. On the other hand, if the signal mask bit is not set for the signal being processed, the traced thread is stopped and the tracing process is notified via ttrace_wait.

As explained above, vfork instructions present a deadlock condition for debuggers that use known tracing facilities. For example, when the ttevt_fork event flag is set under the ttrace tracing facility both the parent thread and the initial thread in the child process stop (after the child process is marked as a traced process and adopts the parent thread's debugger). Both threads log the fact that they stopped in response to a ttevt_fork event. In the case of a vfork instruction where the ttev_vfork event flag is set, when the child process stops, its parent is asleep, and the child borrows the parent's address space until a call to exec or an exit (either by a call to exit or an abnormal termination of the child) takes place. Consequently, continuing the parent process before the child has completed results in an error.

In response, a modified debug interface includes a prefork event and associated processing adapted to multiple tracing facilities such as ttrace and/or ptrace. The modified debug interface and the associated methods described below enable a software tool to control the execution of a child process initiated by an instrumented parent process, where the parent process includes one or more vfork instructions. While the examples below are directed to an example where a parent process is instrumented, the present apparatus and methods are applicable to any modified parent process that includes a vfork instruction.

Figure 2:
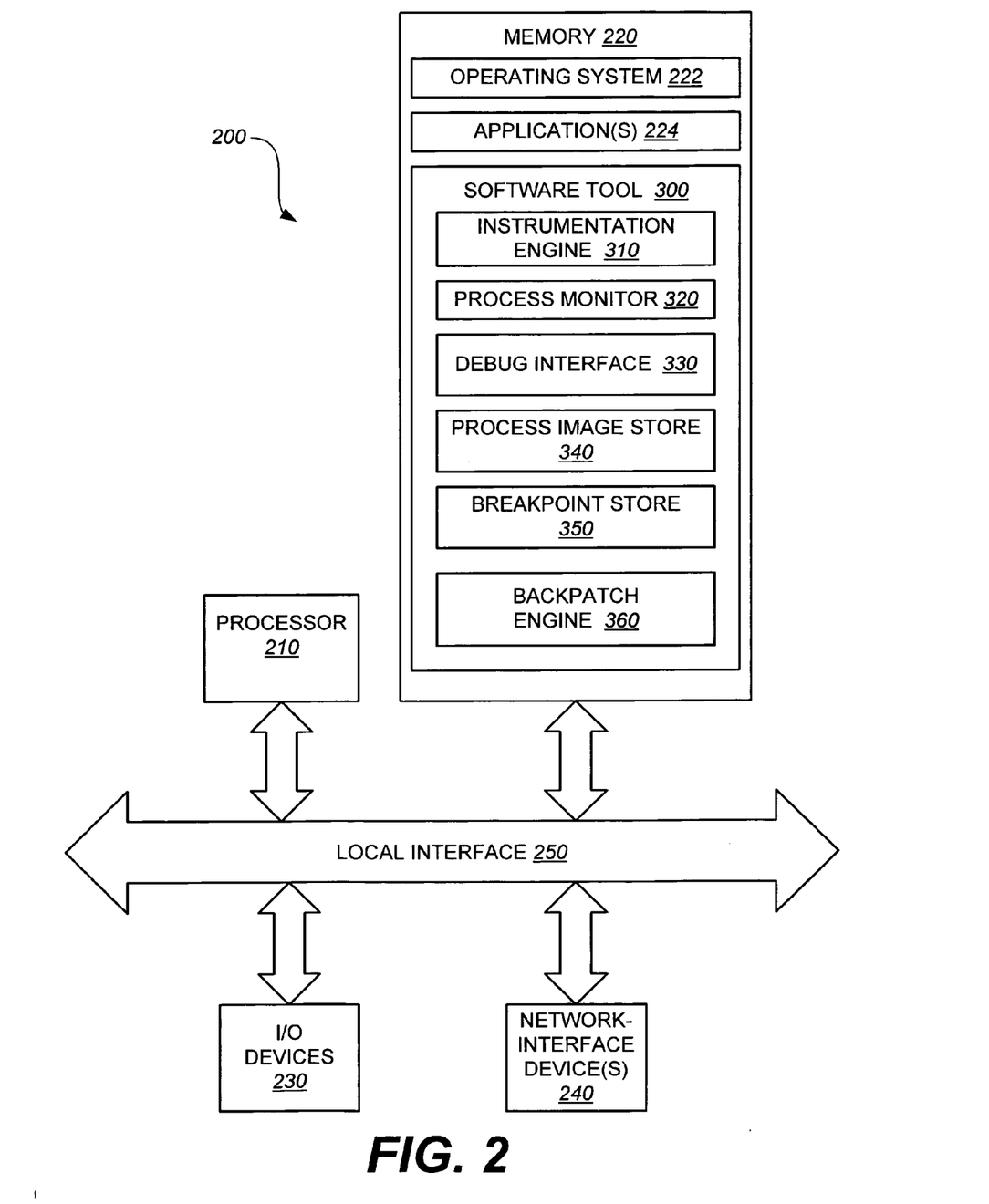
FIG. 2 is a functional block diagram of an embodiment of a computing device.

Turning now to the drawings, reference is made to FIG. 2, which illustrates a functional block diagram of a computing device. Generally, in terms of hardware architecture, as shown in FIG. 2, computing device 200 includes a processor 210, memory 220, input/output device(s) 230, and network interface device(s) 240 that are communicatively coupled via local interface 250. The local interface 250 can be, for example but not limited to, one or more buses or other wired or wireless connections, as known in the art or that may be later developed. Local interface 250 may have additional elements, which are omitted for simplicity, such as controllers, buffers (caches), drivers, repeaters, and receivers, to enable communications. Further, local interface 250 may include address, control, and/or data connections to enable appropriate communications among the aforementioned components.

In the embodiment of FIG. 2, the processor 210 is a hardware device for executing software that can be stored in memory 220. The processor 210 can be any custom-made or commercially available processor, a central processing unit (CPU) or an auxiliary processor among several processors associated with the computing device 200, a semiconductor-based microprocessor (in the form of a microchip) or a macroprocessor.

Memory 220 includes any one or combination of volatile memory elements (e.g., random access memory (RAM, such as dynamic RAM or DRAM, static RAM or SRAM, etc.)) and nonvolatile memory elements (e.g., read-only memory (ROM), hard drives, tape drives, compact discs (CD-ROM.). Moreover, the memory 220 may incorporate electronic, magnetic, optical, and/or other types of storage media now known or later developed. Note that memory 220 can have a distributed architecture, where various components are situated remote from one another, but accessible by processor 210.

The software in memory 220 may include one or more separate programs, each of which comprises an ordered listing of executable instructions for implementing logical functions. In the example of FIG. 2, software in memory 220 includes an operating system 222, one or more application (s) 224, and a software tool 300. Application(s) 224 and software tool 300 function as a result of and in accordance with operating system 222. Operating system 222 controls the execution of the other application(s) 224 and computer programs, such as software tool 300, and provides scheduling, input-output control, file and data management, memory management, and communication control and related services.

Software tool 300 and application(s) 224 include one or more source programs, executable programs (object code), scripts, or other collections each comprising a set of instructions to be performed. As will be explained in detail below, software tool 300 includes logic that controls the execution of application(s) 224. More specifically, software tool 300 includes logic that controls the execution of a child process or thread generated by an instrumented parent process found within application(s) 224 where the parent process or thread includes a vfork instruction. It should be well understood by one skilled in the art, after having become familiar with the teachings of the improved debug interface, that software tool 300 and application(s) 224 may be written in a number of programming languages now known or later developed that support the creation of child processes from a parent process using a vfork instruction. Moreover, software tool 300 and application(s) 224 may be stored across distributed memory elements in contrast with memory 220 shown in FIG. 2.

The input/output device(s) 230 may take the form of human/machine devices, such as but not limited to, a keyboard, a mouse or other suitable pointing device, a microphone, etc. Furthermore, the input/output device(s) 230 may also include known or later developed input/output devices, for example but not limited to, a printer, a display device, an external speaker, etc.

Network-interface device(s) 240 include a host of devices that establish one or more communication sessions between computing device 200 and one or more local and/or wide area networks. Network-interface device(s) 240 may include but are not limited to, a modulator/demodulator or modem (for accessing another device, system, or network); a radio frequency (RF) or other transceiver; a telephonic interface; a bridge; an optical interface; a router; etc. For simplicity of illustration and explanation, these two-way communication devices are not shown.

When the computing device 200 is in operation, the processor 210 is configured to execute software stored within the memory 220, to communicate data to and from the memory 220, and to generally control operations of the computing device 200 pursuant to the software. Operating system 222, one or more application(s) 224, and the software tool 300, in whole or in part, but typically the latter, are read by the processor 210, perhaps buffered within the processor 210, and then executed in accordance with the respective instructions.

As further illustrated in FIG. 2, software tool 300 includes an instrumentation engine 310, a process monitor 320, a debug interface 330, a process-image store 340, a breakpoint store 350, and a backpatch engine 360. Instrumentation engine 310 includes logic configured to alter the address space associated with one or more processes that the software tool 300 desires to monitor, measure, or otherwise control during execution. Instrumentation engine 310 inserts instructions into an address space associated with the target process or processes prior to or during execution of the target process or processes. The inserted instructions include breakpoint events inserted at the entry of instructions that perform a designated function.

Process monitor 320 includes logic configured to identify and respond to events generated by specific processes. Process monitor 320 also includes logic that enables the software tool 300 to successfully execute a child process created by a vfork instruction in an instrumented parent process.

Process-image store 340 includes logic configured to retain a copy of a portion of the uninstrumented address space of a target process. The copy of the portion of the uninstrumented address space includes an original instruction bundle associated with each breakpoint event inserted in the address space of the parent process when the address space was altered by the instrumentation engine 310. Backpatch engine 360 includes logic configured to replace each breakpoint event inserted in the address space during the instrumentation process with the original instruction bundle associated with the breakpoint event as stored in process-image store 340.

Breakpoint store 350 includes logic configured to construct a list of the original instruction bundles instrumented in the address space of the target process. More specifically, the breakpoint store 350 retains a record of the inserted breakpoint event along with the memory address of the original instruction bundle altered by the breakpoint event.

Backpatch engine 360 includes logic configured to return the address space to its unaltered condition for execution of the child process. More specifically, the backpatch engine inserts the original instruction bundles associated with each of the inserted breakpoint events in the address space. Consequently, the address space includes the instruction set of the uninstrumented parent process. With breakpoint events removed from the address space, the child process can execute nominally.

In addition, backpatch engine 360 includes logic configured to reinsert the breakpoint events inserted by the instrumentation engine 310 during the instrumentation process into the address space before the parent process is resumed after termination of the child process. Consequently, the address space is returned to its instrumented condition. With the breakpoint events present again in the address space the software tool 300 can measure, monitor, or otherwise control execution of the parent process after it executes the vfork instruction.

It should be understood that software tool 300 can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. A "computer-readable medium" can be any methods and resources for storing, communicating, propagating, or transporting a program for use by or in connection with the instruction execution system, apparatus, or device. The computer-readable medium can be, for example but not limited to, an electronic, magnetic, optical, electromagnetic, infrared, or semiconductor system, apparatus, device, or propagation medium now known or later developed. Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

Those skilled in the art will understand that various portions of software tool 300 can be implemented in hardware, software, firmware, or combinations thereof. In a preferred embodiment, software tool 300 is implemented using software that is stored in memory 220 and executed by a suitable instruction execution system. If implemented solely in hardware, as in an alternative embodiment, software tool 300 can be implemented with any or a combination of technologies well-known in the art (e.g., discrete logic circuits, application specific integrated circuits (ASICs), programmable gate arrays (PGAs), field programmable gate arrays (FPGAs), etc.), or technologies later developed.

In a preferred embodiment, the software tool 300 is implemented via a combination of software and data stored in memory 220 and executed and stored or otherwise processed under the control of processor 210. It should be noted, however, that software tool 300 is not dependent upon the nature of the underlying processor 210 or memory 220 in order to accomplish designated functions.

Figure 3:
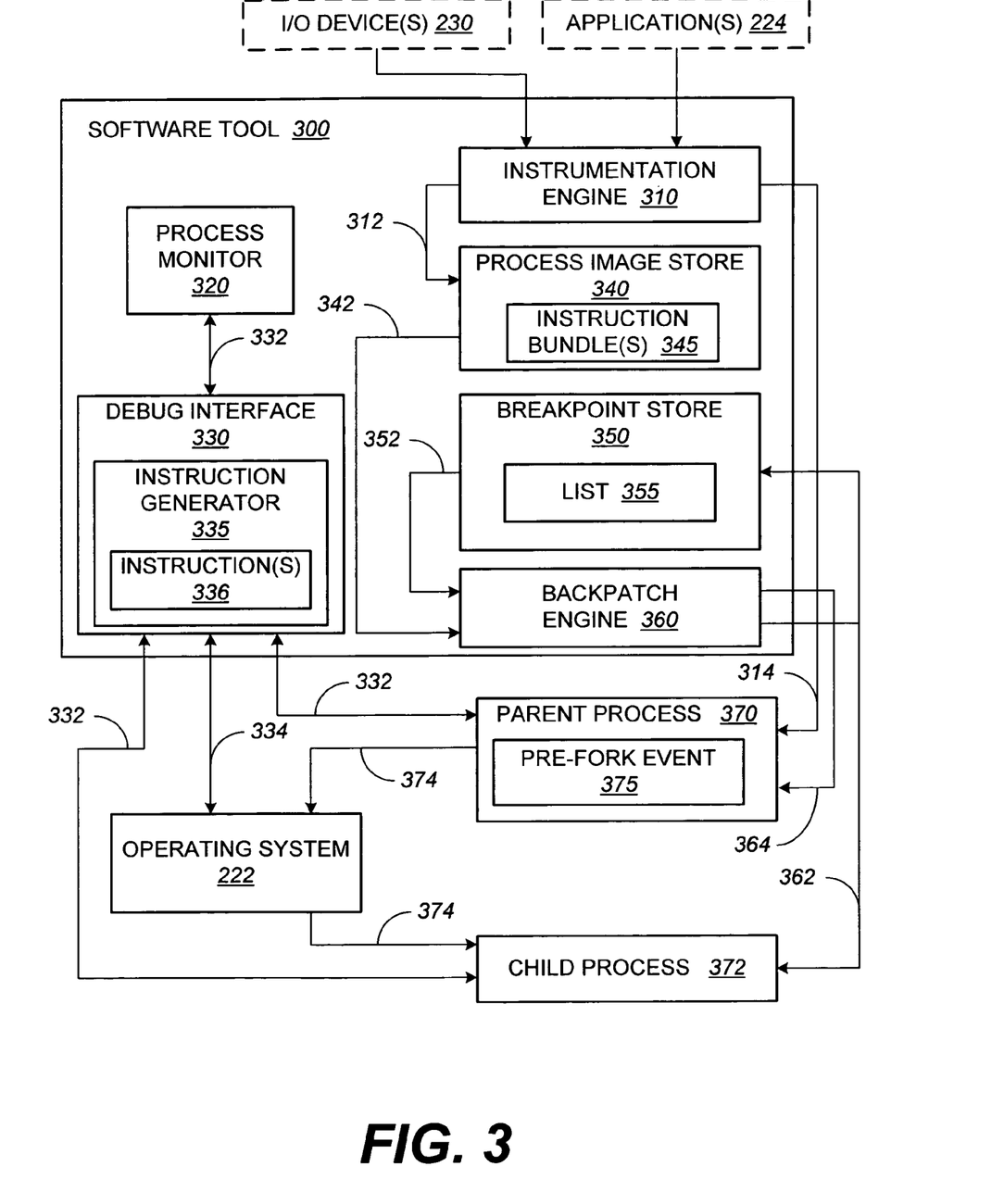
FIG. 3 is a functional block diagram of an embodiment of the software tool of FIG. 2.

Reference is now directed to FIG. 3, which presents a functional function diagram of an embodiment of software tool 300. As illustrated in FIG. 3, software tool 300 includes instrumentation engine 310, process monitor 320, debug interface 330, process-image store 340, breakpoint store 350, and backpatch engine 360. Before software tool 300 can collect and analyze perfonnance information regarding a apecific thread or process, instrumentation engine 310 inserts code into the target process or thread. Preferably, software tool 300 contains logic that in accordance with dynamic binary-instrumentation_techniques, instruments only those portion of parent process 370 that wili be executed by processor 210.

Instrumentation engine 310 may receive data via various input/output devices 230, data stared in memory 220 (FIG. 2), as well as various application(s) 224. The data will identify one or more target processes or tbreads to instrument. In addition, the data may include various parameters and flags that instrumentation engine 310 uses in generating parent process 370. Alternatively, instrumentation engine 310 can be programmed with one or more default parameters to apply when instrumenting (i.e., creating) the target process. Instrumentation engine 310, having received data identifying the target process or thread applies the various parameters and flags and instruments the target process to create parent process 370. Parent process 370 is an instrumented version of the identified target process or thread.

Instrumentation engine 310 is further programmed to forward a copy of the unaltered (i.e., original) instruction bundle(s) 345 that were replaced with the breakpoint events. The unaltered instruction bundles 345 are copied or otherwise forwarded as illustrated by process arrow 312 to process-image store 340. After instrumentation is complete, parent process 370 is copied or otherwise stored in memory 220 as illustrated by process arrow 314.

As further illustrated in the functional function diagram of FIG. 3, software tool 300 includes process monitor 320. Process monitor 320 includes logic for coordinating the collection of data during execution of parent process 370. When parent process 370 includes one or more vfork instructions, process monitor 320 ensures that data collected during execution of both the parent process 370 and its child process 372 are associated with the process responsible for generating the data. Alternatively, when it is desired to execute child process 372 without instrumentation, process monitor 320 ensures proper execution and data collection of parent process 370 and ensures proper execution of the vfork instruction created child process 372.

As shown in FIG. 3, process monitor 320 functions through debug interface 330 and the underlying operating system 222. Information flows between process monitor 320 and debug interface 330 include trace system calls, events, and signals via connections 332.

Debug interface 330 includes logic for receiving and responding to the various trace system calls, events, and signals. In addition, debug interface 330 includes logic for generating instructions 335. Instructions 336 are in accordance with the underlying operating system 222. As illustrated in FIG. 3, debug interface 330 receives and responds to trace system calls, events, and signals 332 generated and sent by parent process 370, child process 372, and process monitor 320.

Operating system 222 as illustrated in FIG. 3, sends and receives instructions 336 both to and from debug interface 330 via instruction interface 334. In addition, operating system 222 receives a vfork instruction 374 from parent process 370. As described in the UNIX® operating system and many of its proprietary and open source derivatives, vfork instruction 374 suspends execution of parent process 370 and generates child process 372 which contains a copy of the instrumented code and trace calls, events, and signals contained within parent process 370.

However, in addition to the other trace system calls, events, and signals 332, parent process 370 communicates a pre-fork event 375 to debug interface 330. Pre-fork event 375 includes indicia identifying child process 372 before it is created by a subsequently executed vfork instruction within parent process 370. The indicia includes at least a process identifier of the child process 372. Debug interface 330 further includes logic configured to recognize and respond to pre-fork event 375.

Software tool 300 uses process monitor 320 to trace the execution of parent process 370. When the child process 372 is generated and executes as a result of the vfork instruction in the parent process 370, process monitor 320 traces execution of child process 372. If child process 372 encounters a breakpoint event, a trace event is generated back to the process monitor 320 and child process 372 is suspended. Thereafter, backpatch engine 360 is configured to replace the initial breakpoint and any subsequent breakpoints in the address space with the appropriate original instruction bundle(s) 345 from process-image store 340 as illustrated by process arrow 342 and process arrow 362. As further indicated by process arrow 362, backpatch engine 360 is configured to generate list 355 for holding in breakpoint store 350. List 355 contains each of the inserted breakpoints and an associated instruction address for each of the backpatched breakpoints. Once the address space reflects the uninstrumented state of the target process, process monitor 320 resumes execution of child process 372.

Child process 372 executes nominally until it terminates. When child process 372 terminates it forwards an exec or exit event to process monitor 320. Parent process 370 resumes execution. Software tool 300 monitors execution of parent process 370 via process monitor 320. When parent process 370 issues a trace event indicating that it is about to resume execution after termination of child process 372, process monitor 320 suspends execution of parent process 370.

Software tool 300 intends to measure or otherwise control parent process 370. Since the address space now under control of parent process 370 was shared with child process 372, the address space contains the backpatched original (i.e., uninstrumented) instruction code. To restore the instrumented version of the address space, backpatch engine 360 uses list 355 containing breakpoints and function entry addresses as indicated in process arrow 352 to insert the breakpoints into the address space of parent process 370 as indicated by process arrow 364. After backpatch engine 360 has completed restoring the instrumented version of the address space, process monitor 320 resumes execution of parent process 370. Thereafter, software tool 300 may resume measurement and or control of parent process 370.

While the functional block diagram presented in FIG. 3 illustrates software tool 300 as having a single centrally-located instrumentation engine 310 with co-located process monitor 320 and debug interface 330, it should be understood that the various functional elements of software tool 300 may be distributed across multiple locations in memory 220 and/or across multiple memory devices (not shown). It should be further understood that instrumentation engine 310 is not limited to dynamic binary instrumentation techniques and may include logic in accordance with binary instrumentation techniques (i.e., logic that instruments all portions of the identified parent process 370) and statistical sampling.

Figure 4:
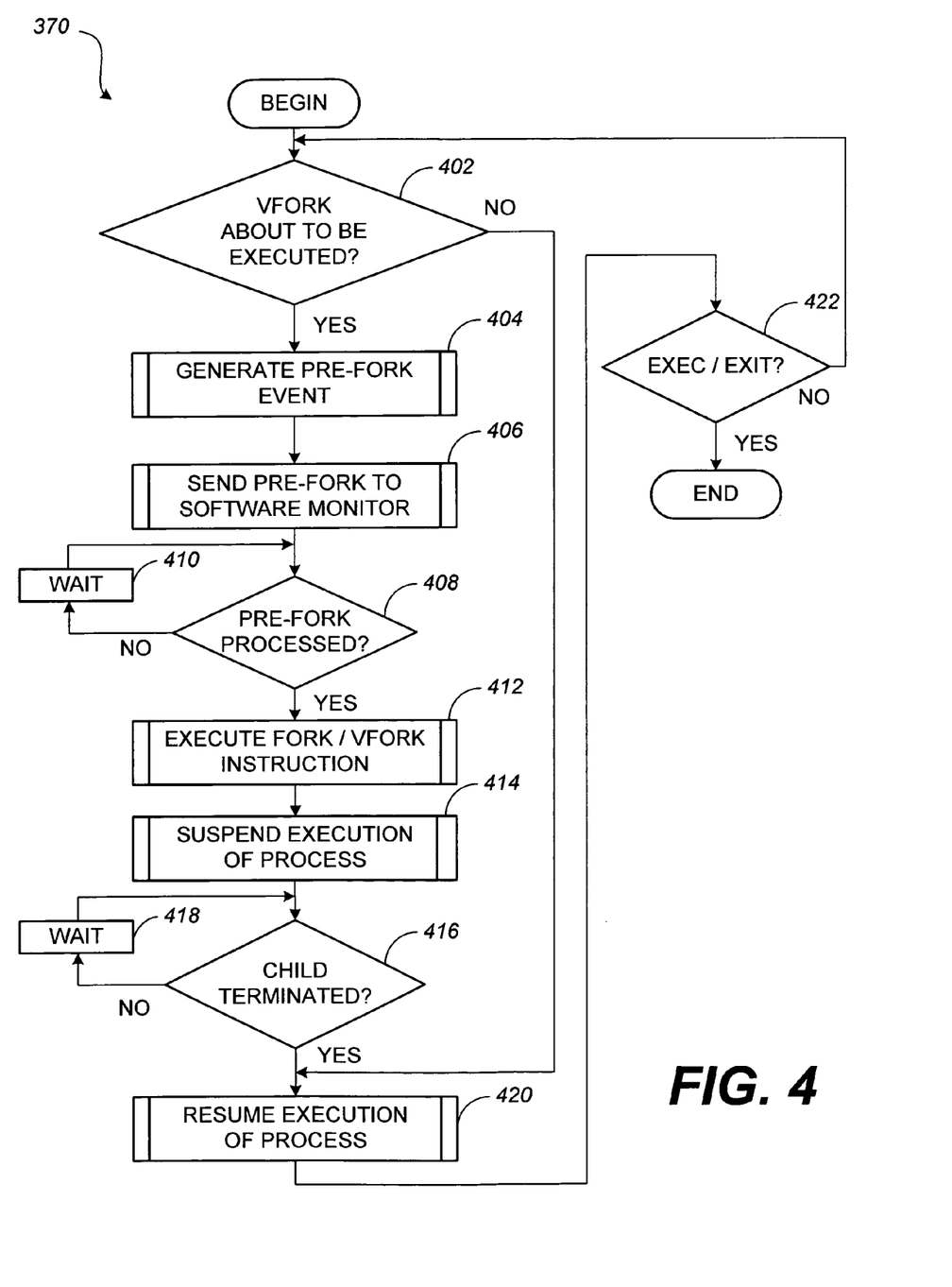
FIG. 4 is a flow chart illustrating an embodiment of a method for executing a parent process that can be implemented by the software monitor of FIG. 3.

FIG. 4 is a flow chart illustrating an embodiment of a method for executing a parent process instrumented by a software tool to ensure execution of a child process when the parent process contains a vfork instruction. As illustrated in query 402, the parent process 370 begins by determining if a vfork instruction is about to be executed by the parent process or thread. When it is determined that a vfork instruction is about to be executed by the parent process or thread as indicated by the flow control arrow labeled "YES" that exits query 402, the parent process generates a pre-fork event as indicated in function 404. Next, as shown in function 406, the parent process sends the pre-fork event to the software tool responsible for instrumenting the parent.

Thereafter, as indicated in the wait loop formed by query 408 and wait function 410, execution of the parent process is suspended until after the parent receives an indication from the software tool that the pre-fork event has been successfully processed. When the pre-fork event has been processed, as indicated by the flow control arrow labeled "YES" exiting query 408, the parent is activated and executes the vfork instruction as shown in function 412. Once the vfork instruction has been executed, the parent is suspended as indicated in function 414.

As indicated in the wait loop formed by query 416 and wait function 418, the parent process remains suspended until the parent receives an indication that the child process has terminated (e.g., the child process generates an exec or an exit event). When the child process has terminated, as indicated by the flow control arrow labeled "YES" exiting query 416, the parent process resumes as shown in function 420. As indicated in query 422, the parent process continues until it terminates nominally and sends an exec event or fails and sends an exit event. As shown by the flow control arrow labeled "NO" exiting query 422, the parent is configured to report any future vfork instructions by repeating the functions and queries described above.

Those skilled in the art will understand that the method for executing a parent process instrumented by a software tool to ensure execution of a child process when the parent process contains a vfork instruction illustrated in FIG. 4 is configured to generate and send a pre-fork event before executing a vfork instruction. The parent process or thread may be implemented via multiple threads for controlling the performance of the desired functions. For example, a first thread may continuously identify when a vfork instruction is encountered in the instruction sequence. A second thread may intermittently be started to wait for an indication that the software tool has successfully processed the pre-fork event. A third thread may be responsible for handling trace events generated by the child process. These and other threads may be executed as may be desired by a parent process or thread to implement the various functions illustrated in FIG. 4.

Figure 5:
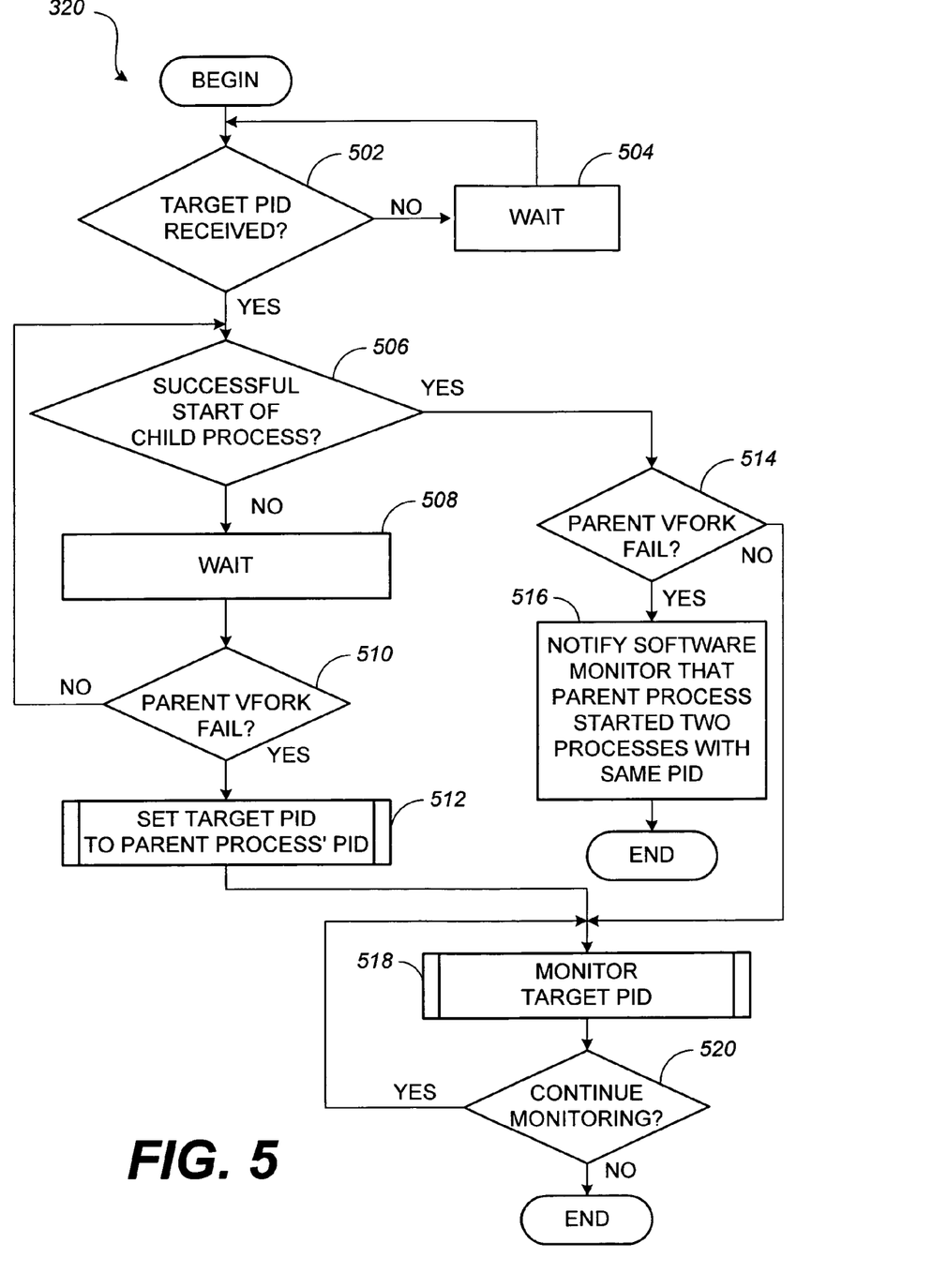
FIG. 5 is a flow chart illustrating an embodiment of a method for executing a process monitor that can be implemented by the software monitor of FIG. 3.

Reference is now directed to the flow chart illustrated in FIG. 5, which illustrates an embodiment of a method for controllably switching a target process of a process monitor thread between an instrumented parent process and a child process generated by the parent process. In this regard, process monitor 320 begins with query 502 where it is determined if the child process has been successfully generated and started. If the result of query 502 indicates that the child process has not started successfully, process monitor 320 is configured to wait as indicated in function 504. Next, query 506 is performed to determine if the parent process has received an indication that the vfork instruction failed. When the parent process receives an indication that the vfork instruction failed as indicated by the flow control arrow labeled "YES," the process monitor sets the active process identifier (PID) to the parent process' PID as shown in function 508. Otherwise, the process monitor returns to query 502. The determinations made in query 502 and query 504 are repeated to handle the case where an event documenting the creation of the child process as a result of the vfork instruction has not been received before the process monitor is started.

After the process monitor has set the PID to the parent process' PID, the process monitor continues by monitoring events and signals generated by the parent process as indicated by the monitoring loop formed by query 514 and function 516.

When the result of query 502 indicates that the child process has started successfully, process monitor 320 is configured to perform query 510 to determine if the parent process received an indication that the vfork instruction failed. In this way, the process monitor confirms that a child process was not generated by the parent process with the same PID identified in the pre-fork event. When the result of query 510 indicates that the vfork instruction failed, the process monitor is configured to notify the software tool 300 that the parent process has started two processes with the same PID as indicated in function 512. Otherwise, when query 510 indicates that the vfork instruction has not failed, the process monitor continues by executing the monitoring loop formed by query 514 and function 516. When query 502 indicates that the child process has started successfully and query 510 indicates that the parent process has not received an indication that the vfork instruction has failed, the target PID will reflect the PID of the child process generated by the vfork instruction executed by the parent process.

Figure 6:
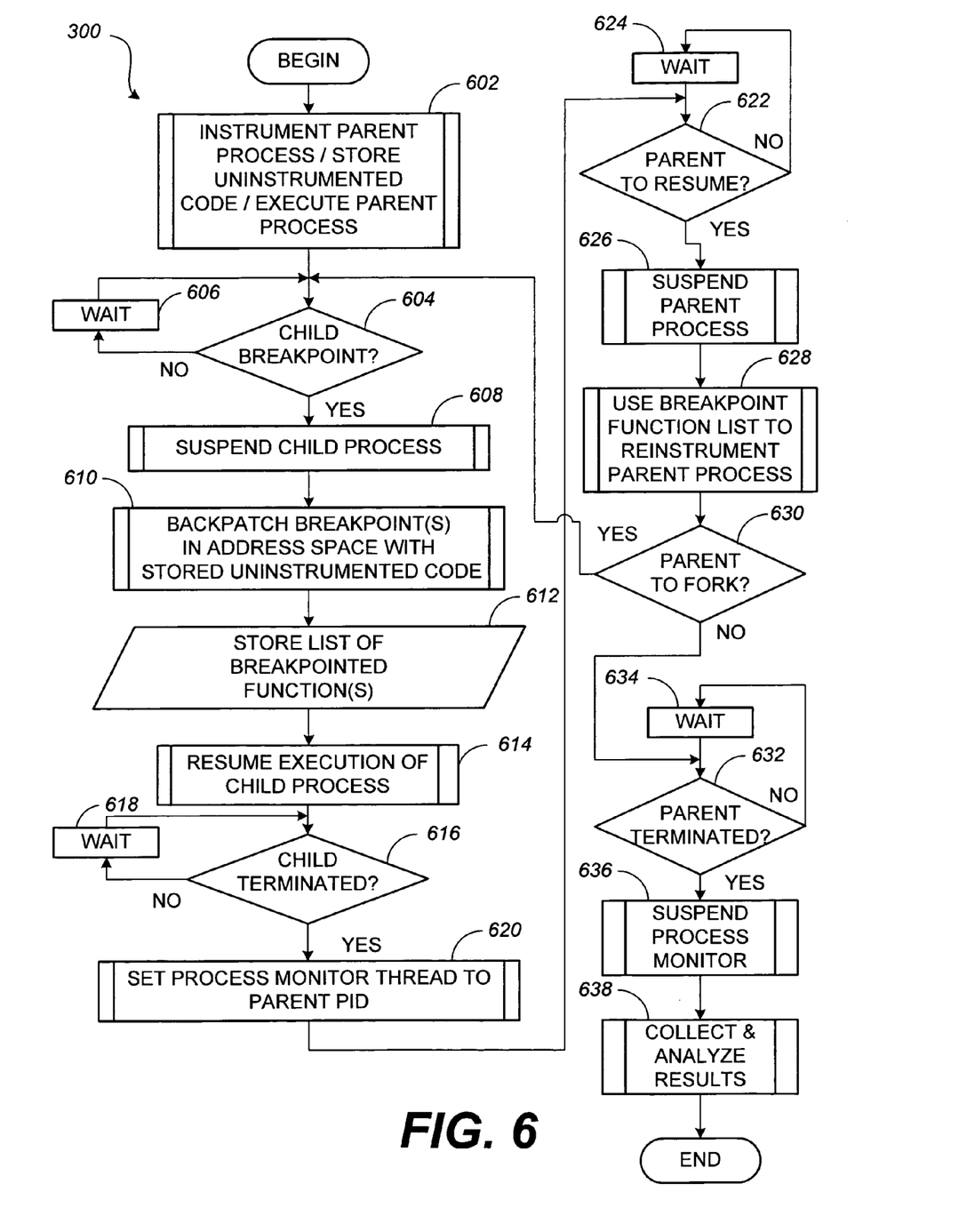
FIG. 6 is a flow chart illustrating an embodiment of a method for processing breakpoint events in a child process generated by an instrumented parent process, as well as a method for run-time measuring a parent process that includes a vfork instruction that can be implemented by the software monitor of FIG. 3.

Reference is now directed to the flow chart illustrated in FIG. 6. In this regard, the various functions shown in the flow chart present both a method for processing breakpoint events in a child process created from a parent process, where the parent process is instrumented by a software tool, as well as a method for run-time measuring a parent process instrumented by a software tool, where the parent process includes a vfork instruction. Both methods may be realized by software tool 300. As illustrated in FIG. 6, the method may begin by instrumenting a parent process as illustrated in function 602. Included in the process of instrumenting is storing an image of the uninstrumented set of instructions associated with each instrumented (i.e., altered) function. The method for processing breakpoint events in a child process continues with query 604 where a determination is made if the child process has encountered a breakpoint. When the child process has not encountered an initial breakpoint as indicated by the flow control arrow labeled "NO" that exits query 604 the enters a wait loop formed by query 604 and wait function 606.

Once the child process encounters a breakpoint as indicated by the flow control arrow labeled "YES" that exits query 604 the method suspends the child process as indicated in function 608. While the child process is suspended, the software tool 300 backpatches each occurrence of a breakpoint encountered in the address space of the child process with the associated uninstrumented (i.e., the original) instructions as indicated in function 610. The software tool 300 also generates and stores a list of the breakpointed functions as illustrated in function 612. Thereafter, as shown in function 614, software tool 300 resumes execution of the now uninstrumented child process. Next, the software tool 300 enters a wait loop formed by query 616 and wait function 618 until it receives an indication that the child process has terminated. When the child process has terminated as indicated by the flow control arrow labeled "YES" that exits query 616, the software tool 300 sets a process monitor thread to monitor execution of the parent process as indicated in function 620.

Software tool 300 then enters a wait loop formed by query 622 and wait function 624. When the parent process indicates that it is about to resume execution after termination of the child process, as indicated by the flow control arrow labeled "YES" that exits query 622, the software tool 300 suspends the parent process as shown in function 626. Thereafter, as indicated in function 628, the software tool 300 uses the breakpoint list to reinstrument the address space of the parent process. Next, the software tool 300 monitors execution of the parent process.

As illustrated in FIG. 6, the software tool 300 enters a monitoring loop formed by query 630, query 632, and wait function 634. When the parent process contains a subsequent vfork instruction as indicated by the flow control arrow labeled "YES" that exits query 630, the software tool 300 is programmed to repeat queries and functions 604 through 630 as may be required. Otherwise when no further vfork instructions are present in the address space of the parent process, as indicated by the flow control arrow labeled "NO" that exits query 630, the monitoring loop waits for the parent process to terminate.

When the parent process terminates as indicated by the flow control arrow labeled "YES" that exits query 632, the software tool 300 suspends the process monitor as indicated in function 636. Thereafter, software tool 300 collects and analyzes the instrumentation results as indicated in function 638.

Those skilled in the art will understand that while the methods illustrated in FIG. 6 are shown in a serial configuration a software tool 300 may include multiple threads for controlling the performance of the desired functions. For example, a first thread may continuously monitor and backpatch breakpoints encountered in vfork-instruction created child processes. A parallel (i.e., simultaneously executed) thread may continuously wait for an indication that a parent process is about to resume execution after termination of a vfork-created child process. The parallel process may be configured to use a breakpoint list to reinstrument the address space of the parent process prior to resuming execution of an instrumented parent process. These, and other, parallel threads may be executed as desired by software tool 300.

Figure 7:
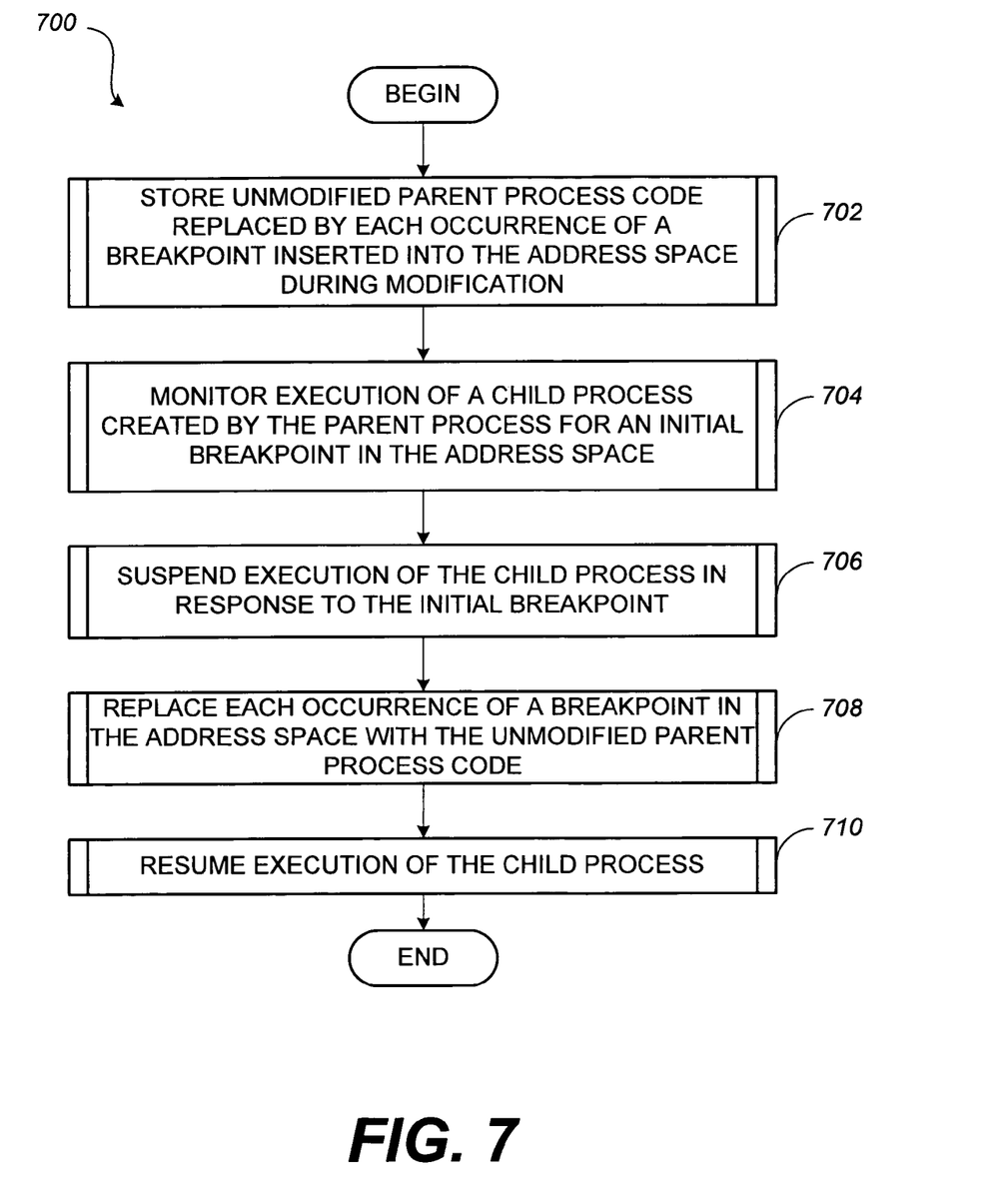
FIG. 7 is a flow chart illustrating an embodiment of a method for processing breakpoint events in a child process where the parent process is instrumented by a software tool.

FIG. 7 is a flow chart illustrating an embodiment of a method 700 for processing breakpoint events in a child process where the parent process is instrumented by a software tool. A software tool begins by storing uninstrumented parent process code replaced by each occurrence of a breakpoint inserted into the address space during instrumentation of the parent process as illustrated in block 702. Next, as shown in block 704, the software tool monitors execution of a child process created by the parent process for an initial breakpoint in the address space. Thereafter, as illustrated in block 706, the software tool suspends execution of the child process in response to the initial breakpoint.

With execution of the child process suspended, the software tool replaces each occurrence of a breakpoint in the address space with the uninstrumented parent process code as shown in block 708. With the breakpoints removed, the software tool then resumes execution of the child process as indicated in block 710.

Figure 8:
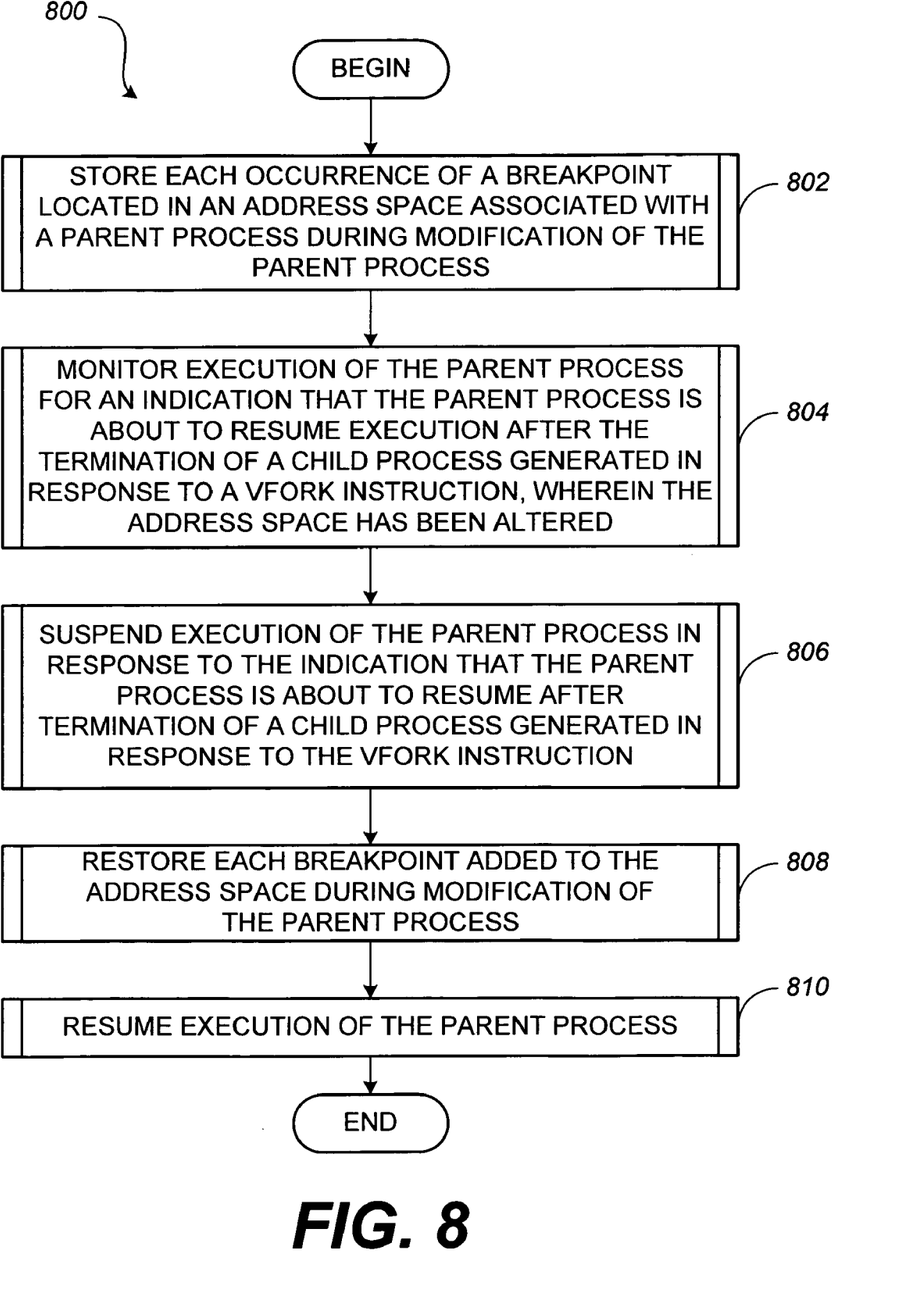
FIG. 8 is a flow chart illustrating an embodiment of a method for run-time measuring a parent process instrumented by a software tool.

FIG. 8 is a flow chart illustrating an embodiment of a method 800 for run-time measuring a parent process instrumented by a software tool. A software tool begins by storing each occurrence of a breakpoint located in an address space associated with a parent process during instrumentation of the parent process as illustrated in block 802. Next, as shown in block 804, the software tool monitors execution of the parent process for an indication that the parent process is about to resume execution after the termination of a child process generated in response to a fork instruction, where the address space has been altered. Thereafter, as illustrated in block 806, the software tool suspends execution of the parent process in response to the indication that the parent process is about to resume after termination of a child process generated in response to the fork instruction.

With execution of the parent process suspended, the software tool restores each breakpoint added to the address space during instrumentation of the parent process as shown in block 808. With the breakpoints replaced, the software tool then resumes execution of the parent process as indicated in block 810.

Any process descriptions or functions in the flow charts presented in FIGS. 4–8 should be understood to represent modules, segments, or portions of code or logic, which include one or more executable instructions for implementing specific logical functions in the associated process. Alternate implementations are included within the scope of the disclosed methods in which functions may be executed out of order from that shown or discussed, including substantially concurrently or in reverse order, depending on the functionality involved, as would be understood by those reasonably skilled in the art after having become familiar with the system and methods for improved debug interface and the associated methods for processing breakpoint events in a child process and run-time measuring a parent process modified by a software tool.

We claim:

1. A method comprising:
   instrumenting a parent process to generate instrumented functions in the parent process so as to create an instrumented version of the parent process;
   storing uninstrumented instructions associated with the instrumented functions of the parent process;
   monitoring with a process monitor execution of a child process created by the parent process for an initial breakpoint in the address space of the child process;
   suspending with the process monitor execution of the child process in response to detection of the initial breakpoint with the process monitor;
   replacing with the process monitor each occurrence of a breakpoint in the address space of the child process with the uninstrumented instructions such that the child process reflects an original, uninstrumented state of the parent process; and
   resuming execution of the child process such that an uninstrumented version of the child process is executed.

2. The method of claim 1, wherein storing comprises retaining a copy of the uninstrumented instructions in a process image store.

3. The method of claim 1, wherein monitoring comprises the process monitor responding to trace events generated by the child process.

4. The method of claim 1, wherein replacing comprises backpatching each occurrence of a breakpoint encountered in the address space of the child process.

5. The method of claim 1, further comprising, after the child process has terminated, the process monitor setting a process monitor thread to monitor execution of the parent process.

6. The method of claim 5, further comprising the process monitor:
   monitoring the parent process for an indication that the parent process is about to resume execution;

suspending execution of the patent process in response to the indication that the parent process is about to resume; and restoring each breakpoint occurrence to the address space of the parent process.

7. The method of claim 6, further comprising the process monitor:

in association with the replacing, generating and storing a list of breakpointed functions such that a record is maintained as to what instrumented functions were replaced in the child process, wherein the restoring is performed by the process monitor in reference to the list.

8. The method of claim 6, further comprising the process monitor:

resuming execution of the parent process; and monitoring execution of the parent process.

9. A computer-readable medium that stores a software tool, the software tool comprising:

an instrumentation engine configured to instrument a parent process to generate an instrumented version of the parent process that contains instrumented functions, the instrumentation engine further configured to store uninstrumented instructions associated with the instrumented functions in a process image store; and a process monitor configured to monitor execution of the parent process and a child process created by the parent process, the process monitor further being configured to suspend execution of the child process upon an initial breakpoint being encountered, to replace each occurrence of a breakpoint in the address space of the child process with the uninstrumented instructions from the process image store, and to resume execution of the child process such that an uninstrumented version of the child process will be executed.

10. The computer-readable medium of claim wherein the process monitor is further configured to monitor the parent process for an indication that the parent process is about to resume execution, to suspend execution of the parent process in response to the indication that the parent process is about to resume, and to restore each breakpoint occurrence to the address space of the parent process such that the instrumented version of the parent process will be executed.

11. The computer-readable medium of claim 10, wherein the process monitor is further configured to generate and store a list of breakpointed functions such that a record is maintained as to what instrumented functions were replaced in the child process, wherein the process monitor restores each breakpoint occurrence through reference to the list.

12. The computer-readable medium of claim 10, wherein the process monitor is further configured to resume execution of the parent process mid monitor execution of the parent process.

* * * * *

UNITED STATES PATENT AND TRADEMARK OFFICE
CERTIFICATE OF CORRECTION

PATENT NO. : 7,185,320 B2 Page 1 of 1
APPLICATION NO. : 10/608179
DATED : February 27, 2007
INVENTOR(S) : Eric Gouriou et al.

It is certified that error appears in the above-identified patent and that said Letters Patent is hereby corrected as shown below:

In column 8, line 67, delete "perfonnance" and insert -- performance --, therefor.

In column 9, line 1, delete "apecific" and insert -- specific --, therefor.

In column 9, line 5, delete "portion" and insert -- portions --, therefor.

In column 9, line 5, delete "wili" and insert -- will --, therefor.

In column 9, line 8, delete "stared" and insert -- stored --, therefor.

In column 9, line 10, delete "tbreads" and insert -- threads --, therefor.

In column 15, line 1, in Claim 6, delete "patent" and insert -- parent --, therefor.

In column 16, line 8, in Claim 10, delete "claim" insert -- claim 9 --, therefor.

In column 16, line 25, in Claim 12, delete "mid" and insert -- and --, therefor.

Signed and Sealed this

Eleventh Day of November, 2008

JON W. DUDAS
*Director of the United States Patent and Trademark Office*